United States Patent Office
3,000,452
Patented Sept. 19, 1961

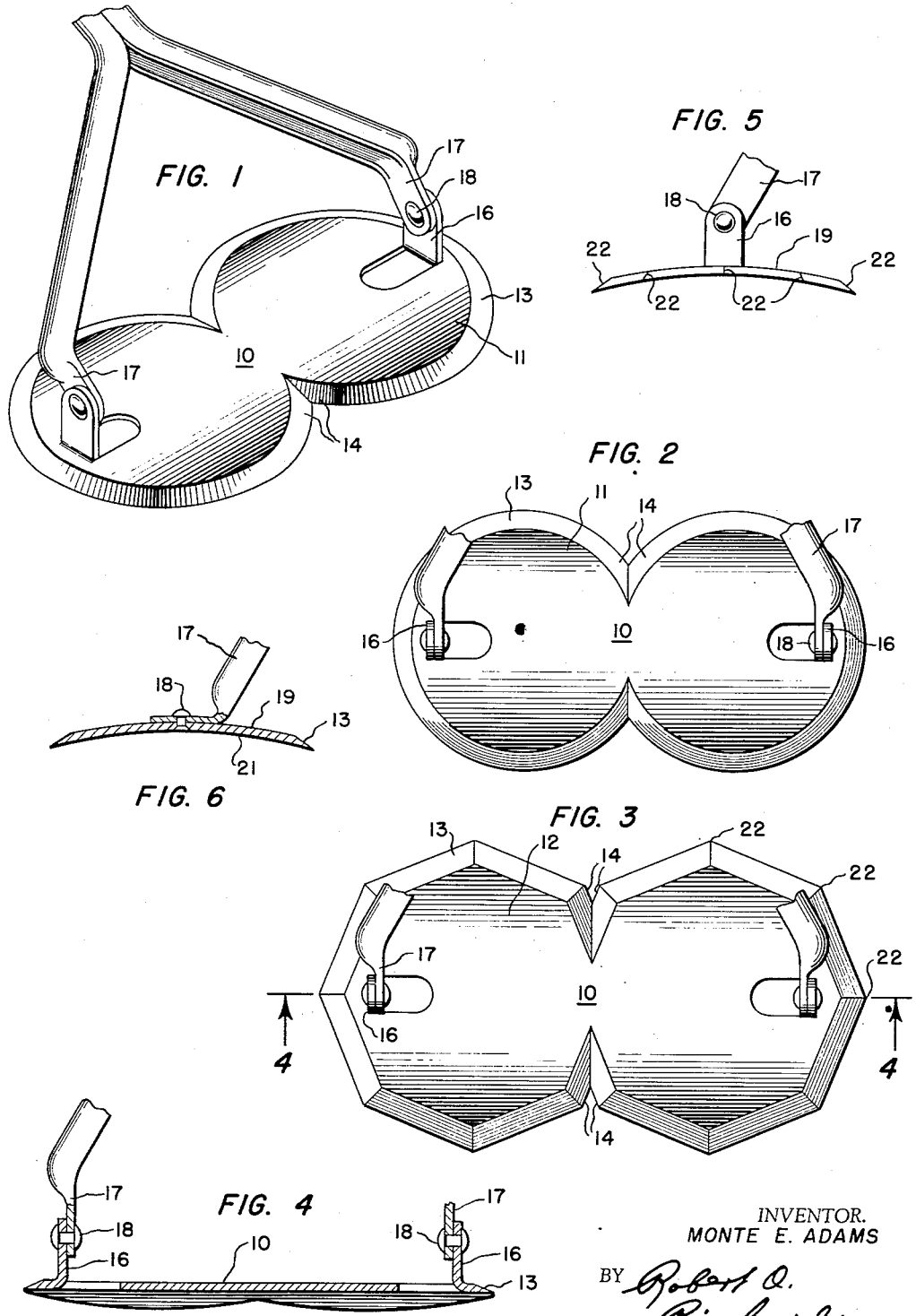

3,000,452
CULTIVATING AND WEEDING HAND TOOLS
Monte E. Adams, 4650 Maple Ave., La Mesa, Calif.
Filed Dec. 8, 1958, Ser. No. 778,788
4 Claims. (Cl. 172—372)

This application is an improvement of my co-pending United States patent application, Serial No. 448,517, filed August 9, 1954, and issued December 16, 1958, as Patent Number 2,864,297.

This invention relates to cultivating and weeding hand tools. More particularly this invention relates to a cultivating and weeding hand tool wherein the blades operate below the surface of the ground.

In my co-pending application a tool is shown wherein a mounting bar is used, upon which a multiple of circular discs have been mounted. The mounting bar adds to the weight of the tool as well as to the resistance of the tool in the required push-pull action in its operation. While this has no serious effect upon its operation when the operator is standing and is using two hands on the handle in operating the tool, the elimination of the bar and a modified blade configuration is preferable when the tool is used with one hand, such as when the operator is in kneeling position.

The present invention comprises a single bladed tool which efficiently produces the effects of the heavier multiple blade configuration and has particular usefulness when operated with a short handle by one hand, such as when the operator is in kneeling position. This tool comprises a single blade yet has a multiple blade design, appearance and effect. The edges are poly-sided or circular in configuration and are beveled from the top side to facilitate its underground movement. The blade has a concave undersurface and convex uppersurface for controlled depth of operation. Suitable mounting provision is made for hand movement thereof in operation.

It is therefore an object of this invention to provide for an improved cultivating and weeding hand tool.

It is another object to provide for a scuffle type hand hoe that is light in weight, durable and efficient in use and which may be fabricated at low cost.

Another object is the provision of a scuffle type hand hoe having a blade in substantially horizontal position for movement under the ground for slicing and/or shearing weeds contacted thereby and for cultivating the earth.

Another object is the provision of a hand hoe of the underground operating type of reduced weight and drag.

Another object is the provision of a hand hoe wherein a single blade is used which has the effectness of a multiple disc desgin.

Another object is the provision of a scuffle type hand hoe designed to dig to a controlled depth when pushed or pulled.

Other objects and features of the present invention will be readily apparent to those skilled in the art from the following specification and appended drawings wherein is illustrated a preferred form of the invention, and in which:

FIGURE 1 is a three dimensional view of the hand tool showing the continuous cutting edge around the entire periphery of this single blade, and showing the terminal lugs cut and formed from the blade itself, FIGURE 2 is a plan view with the handle attachment frame being shown fragmentarily, FIGURE 3 is a plan view of a multiple polysided blade design, FIGURE 4 is a vertical sectional view taken along the line 4—4 of FIGURE 3, FIGURE 5 is a vertical side view of the polysided configuration shown in FIGURE 3, FIGURE 6 is a vertical transverse sectional view through one of the blades and showing an alternate form of handle attachment.

Referring now to the drawing wherein like numerals designate like parts throughout the several views, blade 10 is a single piece of metal shaped in the form of a series of circular merged discs 11 as shown in FIGURES 1 and 2, or in the form of a series of polysided merged cutters 12 as illustrated in FIGURE 3. Either type is sharpened around its entire periphery to form a continuous cutting edge 13. This cutting edge is bevelled from the upper surface of the blade. In either the circular or polysided blade design, cutting crotches 14 are formed which shear off the tougher rooted weeds that are not sliced free by the slicing effect of the blade before entering the crotches. The upstanding terminal lugs 16 have been punched from the face of the blade for attachment with handle terminals 17. This attachment may be done by rivets 18, or by bolts or welding if desired. Bolts with lock washers are preferred since the cutting angle of the blade can then be adjusted for optimum use for a particular composition of soil. These lugs 16 are formed by piercing the blade 10 on three sides as shown, and bending the lug upwardly from the intact side to a position perpendicular to the blade. These lugs are positioned inwardly of the outer edges which extend beyond the mounting configuration to allow cutting at the outer edge of the blade when weeding against foundations, curbs, walls, etc. In the embodiment shown in FIGURE 6 the terminal lugs have been eliminated by turning the handle terminal ends 17 into horizontal position and securing to the top surface of the blade, such as by riveting, for example.

The blade is curved transversely so that the upper surface 19 of the blade is convex and the under surface 21 is concave. This transverse curvature of the blade, together with the top bevelled edge, aids in securing a controlled penetration of the soil. This feature provides the necessary, but limited, digging action to cultivate the soil while slicing weed roots under the surface of the ground. With this concave feature each stroke slices a comparatively thin layer of earth; the more strokes the deeper the pulverizing, cultivating and root cutting effect. With the circular disc design, all weeds contacted are either sliced or sheared free depending on whether they are cut by the outer periphery of the blade or in the crotches. With the polysided disc design, the transverse curvature of the blade not only effects limited and controlled digging action but also changes shoulder angles at transition of one cutting edge to the next as shown at 22 in FIGURE 5. These definite shoulders at different angles cause an abrupt change in the slicing rate, even when the blade is pushed or pulled at a uniform rate, and thereby enhance cutting action. There are fourteen such shoulders on the embodiment shown in FIGURE 3 and with the multiple cutting edges all being at different angles to the line of thrust, a changing slicing action is provided that is extremely effective and considerably minimizes the required effort for cultivating and weeding. The combined features of controlled digging while slicing are equally effective both in the pushing and pulling action of normal operation of the hoe.

While the embodiments shown have a blade configuration of two merged circular or polysided discs, it should be understood that a configuration or any number of discs may be used. It should be understood that the invention is not limited to the certain preferred embodiments that are specifically disclosed since there are many variations that will be readily apparent to those skilled in the art and the invention is to be given its broadest possible interpretation within the terms of the following.

I claim:
1. A cultivating and weeding hand tool comprising a single cutting blade having the configuration of multiple merged disc cutters forming cutting crotches front and rear, said blade being sharpened around its entire periphery to form a continuous cutting edge, any portion of which edge projects at an angle from the normal direction of thrust to produce a slicing effect on contact with weeds, said blade having at least a pair of apertures therein, a handle having end portions positioned over said apertures and means extending through said apertures and connected to said end portions to thereby attach said handle for front and rear movement of said blade.

2. In a cultivating and weeding hand tool as in claim 1, said multiple merged disc cutters being of intersecting circular disc configuration and wherein said crotches are formed at the intersection of said intersecting discs.

3. A cultivating and weeding tool as in claim 1 wherein said blade is curved concave front to rear on its under surface to effect limited and controlled digging action combined with said slicing action in both push and pull strokes.

4. A cultivating and weeding hand tool as in claim 1 wherein said multiple merged disc cutters are of polysided disc configuration and wherein said crotches are formed at the intersection of said polysided discs.

References Cited in the file of this patent

UNITED STATES PATENTS

| | | |
|---|---|---|
| 678,535 | Bigg | July 16, 1901 |
| 841,488 | Doidge | Jan. 15, 1907 |
| 1,239,316 | Svendsen | Sept. 4, 1917 |
| 2,579,229 | Erickson et al. | Dec. 18, 1951 |
| 2,864,297 | Adams | Dec. 16, 1958 |

FOREIGN PATENTS

| | | |
|---|---|---|
| 550,368 | Germany | May 11, 1932 |
| 1,016,474 | Germany | Sept. 26, 1957 |